Jan. 31, 1961     J. W. HENDRY     2,969,563
PLASTIC WORKING PROCESS AND APPARATUS
Filed June 16, 1958
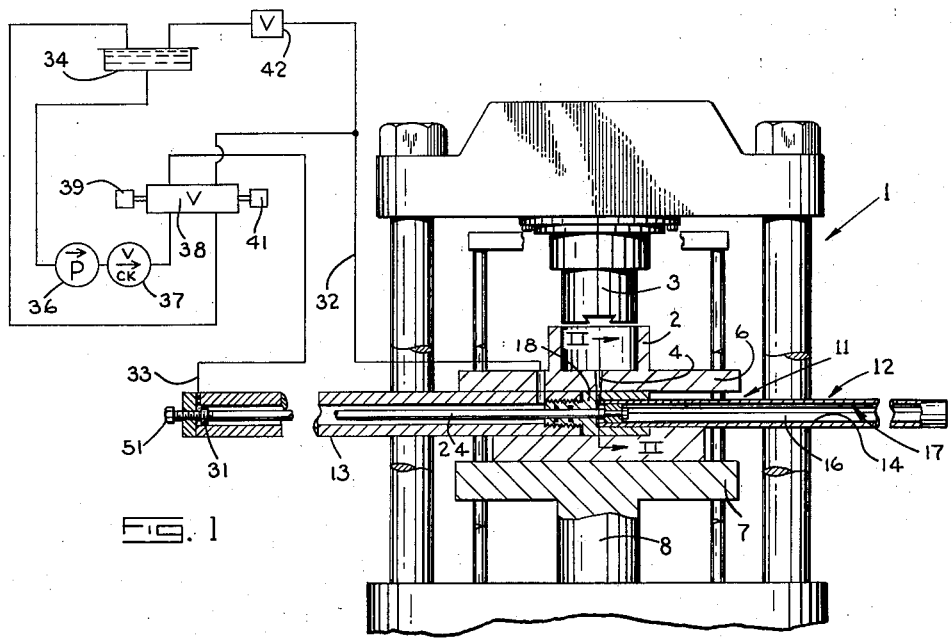
FIG. 1
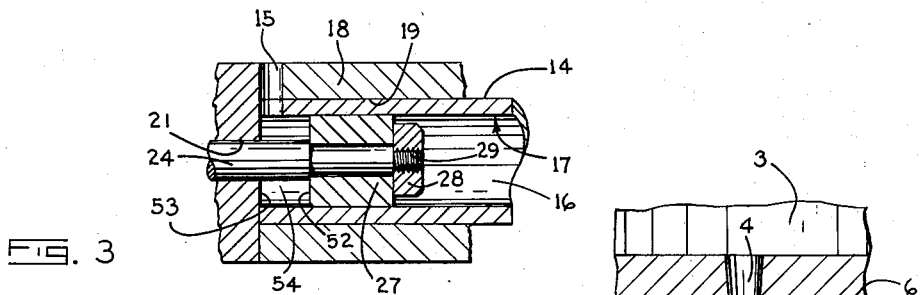
FIG. 3
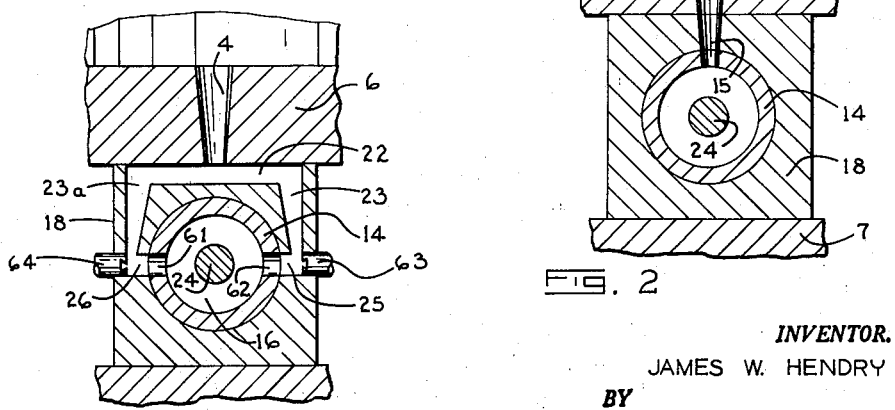
FIG. 4
FIG. 2
INVENTOR.
JAMES W. HENDRY
BY
Woodhams Blanchard & Flynn
ATTORNEYS

United States Patent Office 2,969,563
Patented Jan. 31, 1961

2,969,563

PLASTIC WORKING PROCESS AND APPARATUS

James W. Hendry, Louisville, Ky., assignor to Tube Turns Plastics, Inc., Louisville, Ky., a corporation of Delaware Filed June 16, 1958, Ser. No. 742,159

4 Claims. (Cl. 18—30)

This invention relates to a process and apparatus for making generally tubularly shaped articles such as pipe trough-like articles or the like, from synthetic organic plastic material and relates particularly to a process for making such tubularly shaped articles and to an apparatus by which said process may be practiced.

While the process and apparatus of the invention are applicable to the molding of a wide variety of tubularly shaped articles, the specific need out of which this invention arose and the particular product which it was desired to make was pipe of various kinds and sizes and made from a variety of different plastic materials. Accordingly, for illustrative purposes and without any intention to limit the scope of the invention, reference will hereinafter be made to the making of pipe but it will be understood that this reference to a specific product is illustrative only. Similarly, although either injection or transfer types of molding apparatus and techniques may be utilized in and with the apparatus and method of the invention, it is convenient to illustrate the invention by reference to transfer molding techniques and apparatus and the description will proceed accordingly, but such specific reference is also solely for illustrative purposes and is not limiting.

While the making of pipe from plastic materials of different kinds has been known for many years, it has usually, insofar as I am aware, been carried out by extrusion methods and extrusion type equipment. This works well enough for plastic materials of readily extrudable types where the pipe can be made on a continuous basis and at a relatively high rate of speed. However, in a continuing effort to improve the techniques and apparatus for making pipe, a great deal of effort has been expended (1) to improve the speed at which pipe can be made from the conventional, easily molded, materials without sacrificing the quality of the pipe produced, and (2) to extend the range of plastic materials from which pipe can be made to include those materials which are known to have good chemical and/or physical properties for pipe use but whose molding characteristics have thus far limited, or prevented, their effective handling by extrusion methods.

For example, in making pipe from materials which are of high viscosity when a moldable condition, such as substantially unplasticized polyvinyl chloride, the maximum rate of extrusion for producing commercially acceptable pipe is extremely low and therefore pipe is formed at an extremely low rate, such as a rate of approximately 1 foot of pipe per minute for three inch diameter pipe having a 3/16 inch wall.

On the other hand, material such as "Penton," a linear polyether resin, sold by Hercules Powder Company, Wilmington, Delaware is of such low viscosity when at or near its moldable condition that it will not hold its shape when it comes out of the extrusion orifice. Attempts have been made to chill the material as it comes out of the extrusion orifice but these have not been successful because the low heat conductivity of the plastic material prevented sufficiently rapid chilling of the material. Other attempts have been made to extrude this material through a vertically downwardly directed die but the material is of such low viscosity when it first leaves the die that it will not even support its own weight. Therefore, although the material has excellent properties for pipe usage from many standpoints, attempts with which I am acquainted to form it into pipe by extrusion methods have been totally unsuccessful.

Other examples of the difficulty of forming pipe from either extremely high or extremely low viscosity materials might be given but the foregoing will serve to illustrate the nature of this phase of the problem.

Accordingly, the objects of the invention are:

(1) To provide a process, and apparatus for practicing said process, by which tubular articles can be made from plastic materials having either an extremely high molding viscosity or from materials having an extremely low molding viscosity;

(2) To provide a process and apparatus, as aforesaid, for molding tubular articles using transfer types of molding techniques;

(3) To provide a process and apparatus, as aforesaid, by which tubular articles can be molded at an extremely high rate of speed;

(4) To provide a process and apparatus, as aforesaid, by which substantially flaw-free tubular articles can be molded at rates of speed comparable to other transfer molding operations;

(5) To provide a process and apparatus, as aforesaid, by which pipe and similar products can be made at a rate of speed substantially higher than such articles can be made by extrusion methods;

(6) To provide a process and apparatus, as aforesaid, by which pipe and similar articles can be made from materials which are not readily adaptable to extrusion techniques, such as materials of extremely high viscosity when in moldable condition or materials of extremely low viscosity when in moldable condition;

(7) To provide a process and apparatus, as aforesaid, by which very long and relatively thin walled articles can be molded with very little waste;

(8) To provide a process, as aforesaid, which is capable of being practiced by relatively simple apparatus;

(9) To provide an apparatus, as aforesaid, which is of relatively simple character and which can be used to adapt a substantially conventional molding machine, such as a conventional transfer molding machine, to forming tubular articles;

(10) To provide an apparatus, as aforesaid, wherein the size of tubular article being molded, such as a pipe, can be readily changed as desired;

(11) To provide an apparatus, as aforesaid, for use with a machine either of the injection molding type or the transfer molding type whose cycle for molding tubular articles will not be appreciably, if any, longer than the molding cycle for molding other types or shapes of articles of comparable weight and cross sectional area.

Other objects and purposes of the invention will become apparent to persons acquainted with methods and apparatus of this general type upon reading the following specification and inspection of the accompanying drawings.

In the drawings:

Figure 1 is a central cross sectional view of apparatus embodying the invention and showing same in association with the essential operating parts of a conventional transfer molding machine.

Figure 2 is a sectional view taken on the line II—II of Figure 1.

Figure 3 is a fragmentary view on an enlarged scale of the structure shown in Figure 1 at the end of the molding chamber adjacent the gate.

Figure 4 is a view similar to Figure 2 and showing a modification.

*In general*

In general, the process aspects of the invention include the steps of introducing plastic material into a relatively small annular mold zone and causing same to fill said mold under substantial pressure. The plastic material is then continued to be urged into said mold and an axial end wall of said mold is moved axially away from the mold zone at a rate somewhat less than the rate at which plastic material is available to enter and fill the mold zone. As the wall is moved axially the previously introduced plastic material follows and moves away with said wall. For making pipe, the plastic material so introduced is caused to flow and form around a mandrel which is subsequently withdrawn when the movable wall has withdrawn from the original mold zone its maximum distance. The plastic material shrinks slightly as it chills and thereby draws itself slightly away from the external walls of the mold and the inner opening therethrough also contracts slightly. After the mandrel has been withdrawn from within the inner opening of the pipe and the aforementioned shrinkage has occurred, the mandrel can be used as a knock out rod for moving pipe out of the mold. Since the period required to withdraw the mandrel from the formed tube is substantially equal to the time required for the plastic material to complete its initial rigidification and shrinkage, and since the subsequent stroke of the mandrel for ejecting the formed article from the mold returns the mandrel to its position for starting the next cycle, the cycle is extremely rapid and pipe can be produced with the method and apparatus of the present invention at a rate many times faster than is possible with materials of the nature above indicated when handled by extrusion methods, even assuming that such materials can be handled by extrusion methods at all.

The apparatus aspects of the invention consist of a structure for use with either an injection molding machine or a transfer molding machine of substantially conventional nature, which structure functions as the mold portion thereof. An elongated tubular mold is arranged to receive plastic material thereinto at one end thereof. A mandrel extends through said one end and supports a piston within said tubular mold. Means are provided for applying pressure axially to said mandrel in one direction or the other as desired.

*Detailed description*

In the following description a number of terms will be used for convenience in reference, which terms will be recognized as being used for convenience only and which will not be construed as limiting unless the express language of the context clearly indicates such an intention. For example, the term "plastic material" will refer to and include any kind of plastic material, usually of the synthetic organic type, which is capable of being molded under heat and pressure. While the method and apparatus of the invention is primarily intended and adapted for handling plastic materials having extremely high molding viscosity or those having extremely low molding viscosity, the use of the method and apparatus is by no means limited thereto and any kind of plastic material capable of being molded by injection methods can be molded by the method and apparatus of the invention. With reference to the specific machine shown herein to illustrate the invention, the terms "upward" and "downward" and derivatives thereof and words of similar import shall refer to directions taken with respect to the machine when in its normal position of use, that is, directions appearing upwardly and downwardly in the drawings. The terms "rightward" and "leftward" and derivatives thereof and terms of similar import will refer to directions taken with respect to the drawings. The terms "inward" and "outward" and derivatives thereof and terms of similar import shall refer to directions toward and away from the geometric center of the part to which reference is at the moment being made.

While the process of the invention can be practiced by a variety of specific injection or transfer type molding machines, it can be conveniently described by reference to one specific machine by which said process can and has been satisfactorily carried out and accordingly reference will be made thereto to illustrate both the method and the apparatus aspects of the invention.

Referring now to the drawings, there is indicated at 1 a transfer molding machine of generally conventional type which for illustrative purposes is shown as including a transfer pot 2, a stationary transfer ram 3, a discharge passageway 4 and mold retaining platens 6 and 7. The upper platen 6 is normally fixed rigidly to the structure defining and containing the transfer pot but may be movable with respect thereto if desired for the purpose of setting up the machine for operation and for servicing. The lower platen is normally movable upwardly and downwardly in response to movement of a pressure ram 8 which is actuated and controlled by any convenient and well known mechanism, not shown.

The adapter 11 utilized with the transfer press 1 consists essentially of a mold section 12 and a mandrel operating cylinder 13. The mold section 12 consists of an elongated tube 14 having an internal wall 17 defining an internal opening 16. The tube 14 extends rightwardly from a sprue block 18 by which said tube is supported and through which plastic material introduced from the transfer pot 2 and passageway 4 into said tube.

The sprue block 18 has an opening 19 (Figure 3) therein for receiving the leftward end of the tube 14 and also has a coaxial opening 21 extending leftwardly from said opening 19 but of lesser diameter for reasons appearing hereinafter. A passageway 15 extends through the sprue block 18 and through the tube 14 to provide communication from the discharge passageway 4 to the internal opening 16 of the tube 14. Said passageway 15 is located at the extreme leftward end of the tube 14.

A mandrel 24 extends through the opening 21 in the sprue block 18 and is received with the opening 16 of the tube 14. A mold piston 27 secured to the mandrel 24 at the rightward end thereof and is slidable therewith within the tube 14, said piston being in close sliding fit with the internal wall 17 of said tube. The piston 27 is removably secured to the rightward end of the mandrel 24 by an easily detachable device, such as a nut 28 associated with the threaded end 29 of said mandrel.

The leftward end of said mandrel 24 has a piston 31 mounted thereon and said piston is slidable within the cylinder 13. Pressure fluid conduits 32 and 33 are connected to the respective ends of cylinder 13 and are connected to any suitable hydraulic system by which pressure fluid may be introduced as desired into one end or the other end of said cylinder.

One specific hydraulic system which has been utilized satisfactorily is schematically illustrated in Figure 1. Here a reservoir 34 is connected to a pump 36 whose output passes through a check valve 37 and thence to a suitable valve 38. The valve 38 may be operated in any convenient manner, such as by solenoids schematically indicated at 39 and 41. An adjustable bleed off valve 42 is provided and provides a connection between the line 32 and the reservoir.

An adjustable spacer 51 is provided at the extreme leftward end of the cylinder 13 in order to determine the extreme leftward position of the piston 31 and thereby the mandrel 24 and the mold piston 27. As appearing in greater detail hereinbelow, there should at all times be some space between the leftward face 52 of the mold piston 27 and the end wall 53 of the forming chamber or initial mold zone 54 in order to permit plastic material to enter thereinto.

Operation

Turning now to the operation of the transfer type molding machine above described, reference to the operation of said machine will be utilized for setting forth one concrete example of the process of the invention. However, it will be recognized that the steps of the process may be performed by other transfer molding type apparatus and that utilizing one particular type of apparatus to illustrate the process is for convenience and definiteness of reference and is in no sense limiting.

At the commencement of a molding cycle, pressure fluid is introduced into the rightward end of the cylinder 13 whereby to move the cylinder piston 31, the mandrel 24 and the mold piston 27 to their extreme leftward positions as determined by the spacer 51. A suitable quantity of properly prepared plastic material is then placed in the transfer pot 2 and the ram 8 is raised to move the transfer ram 3 within said pot and thereby drive said material through the discharge passageway 4 and the passageway 15 into the forming chamber 54. The plastic material quickly fills the forming chamber and, since the mold piston 27 continues to be held under a substantial leftwardly acting pressure, the plastic material within said forming chamber forms a closely welded, non-porous and well formed piece. The total force exertable on the cylinder piston 31 in a leftward direction is, however, somewhat less than the total force exertable by the plastic material in the rightward direction against the mold piston 27. Thus, as the pressure rises in the forming chamber, as it does very quickly, the total force exerted by the plastic material in the rightward direction soon exceeds the total force exerted by the cylinder piston in a leftward direction and the plastic material starts to force the mold piston rightwardly against the pressure exerted thereon by the pressure fluid in the rightward end of the cylinder 13. The pressure fluid within said cylinder escapes through bleed-off valve 42 into the reservoir 40 when the cylinder piston 31 moves rightwardly with said cylinder. Since the passageway 15 is the source of the pressure acting on the plastic mass, the portion of the plastic mass rightwardly of said passageway and bearing against the mold piston can rigidify and can move with said mold piston and with the mandrel as the mandrel and mold piston are, and continue to be, forced rightwardly by the continuously entering stream of plastic material entering from the passageway 15. Thus, the only flow of plastic material occurring anywhere within the tubular member 14 takes place in the immediate vicinity of the passageway 15 and the plastic material moving rightwardly from said passageway does not move at all with respect to either the mold piston or the mandrel. It will be evident that the relative forces exerted by the transfer ram as compared to the forces exerted by the cylinder piston 31 will be at least partially balanced and opposing so that the plastic material within the tubular member 14 will at all times remain under a suitable pressure to thereby render the final product properly dense and fault free. However, since the fluid pressure is continuously exerted in cylinder 13 and since the rightward motion of the mold piston 27 and of the mandrel 24 is caused by the pressure of the plastic material entering from the passageway 15, the movement of the mandrel remains at all times subject to the control of the pressure within the mandrel cylinder 13 so that the material will be properly densified even where the rate of entry of plastic material into the forming chamber is not uniform.

When the plastic material has been entirely, or substantially entirely, expelled from the transfer pot 2, the mandrel 24 and parts associated therewith will presumably be at their extreme rightward limit of movement. However, whether it is or is not at its extreme rightward limit of movement, the pressure exerted within the mold will still be that determined by the pressure exerted by transfer ram and by the fluid pressure within cylinder 13 and will not vary with the amount of plastic material placed in a given cycle within the transfer pot. However, preferably, when the injection or transfer molding operation is completed, the rightward end of the mold piston 27 will protrude from the rightward end of the tubular member 14 so that the nut 28 can be removed and the mold piston removed from the mandrel. The pressure on the rightward side of the cylinder piston 31 is then increased to draw the mandrel 24 leftwardly and out of the central opening within the molded article. The natural shrinkage of the plastic material as it rigidifies causes same to pull slightly away from the internal wall 17 of the tube 14 and also reduces slightly the diameter of the central opening of the molded plastic body. The ram 3 may now be retracted and this will withdraw the sprue from the sprue opening 4 and the passageway 15, breaking off the sprue at the lower end, or gate, of the passageway 15 in a conventional manner.

Next, pressure is supplied to the leftward side of the cylinder piston 31 to force the mandrel 24 rightwardly. With the central opening of the mold body now being of slightly reduced diameter, due to the natural shrinkage of the plastic upon rigidification, said mandrel will engage the leftward end of the plastic article and drive it rightwardly out of the tubular member 14. When the molded plastic article is removed from the tubular member 14, the mandrel 24 will again protrude from the rightward end of said tubular body and the mold piston 27 and nut 28 may be replaced thereon. Pressure can then be reapplied to the rightward side of the cylinder piston 31 so that the mandrel will be returned leftwardly to the limit determined by the stop 51. The machine is then ready for repeating the molding cycle.

Modifications

Figure 4 shows a modification of the sprue and runner structure by which the plastic material may be introduced into the forming chamber from opposite sides thereof. A channel 22, normally closed by the upper platen 6, is formed in the upper side of the sprue block 18 and communicates with runners 23 and 23a which are located on opposite sides of the tube 14. Openings 25 and 26 extend diametrically inwardly from the lower ends of runners 23 and 23a and communicate with gates 61 and 62 in opposite sides of the tube 14 to provide a path for introducing plastic material simultaneously through both sides of said tube. For very large constructions, it may be desirable to have three or even four of such openings preferably spaced equally around the circumference of the tube 14. The adapter 11 is positioned in and with respect to the transfer press 1 so that the discharge passageway 4 of the transfer press communicates with the channel 22 of the adapter. The runners 23 and 23a are tapered so that upon lifting the upper platen 6 upwardly away from the block 18 the sprues in passageways 23 and 23a will break off at the respective lower ends thereof. The material in the runners 23 and 23a together with the material channel 22 may be manually broken off from the lower end of the material within the sprue opening 4. The material within the passageways 25 and 26 may be removed in any conventional manner, such as by withdrawal, manually or mechanically, of the sprue pullers 63 and 64.

It will be recognized that certain specific mechanical details have been utilized in the above described apparatus for the purpose of illustrating specific forms of the invention, but it will be understood that these details are illustrative only and are not intended to be limiting. Instead, the appended claims will be construed as including such variations thereof as will be apparent to persons skilled in the art excepting as the claims may be by their own terms expressly provided otherwise.

I claim:

1. In a process for injection molding elongated, tubular articles of substantially uniform cross section, utilizing an elongated mold, a mandrel movable longitudinally through said mold, said mandrel having a piston thereon slidably contacting the internal wall of said mold, the steps comprising: introducing moldable plastic material under pressure into a molding zone at one end of said mold while applying a pressure to said mandrel urging same in a first direction toward said one end of said mold so that the material entering the mold causes the piston to move axially against said pressure, controlling the pressure of the incoming plastic material with respect to the pressure opposing movement of said piston such that the plastic material will continue to enter into the mold and continue to force the piston axially in a second direction away from said one end of said mold to expand said molding zone and a sufficient pressure will be maintained on said piston to insure proper densification of the plastic material; commencing the rigidifying of that portion of said material moving at any given instant away from said one end of said zone and continuing to inject said material until said piston has moved a predetermined distance away from said one end of said mold; terminating the entry of said plastic material into said molding zone; disconnecting said piston from said mandrel and moving said mandrel in said first direction beyond said one end of said mold; cooling the material in the mold to cause the central opening formed therein by said mandrel to shrink to a size less than the size of said mandrel; and then moving said mandrel in said second direction to engage one end of the material and push same out of the mold.

2. An apparatus for injection molding an elongated tubular body, comprising: an elongated tubular mold having an opening at one end thereof through which material may be injected thereinto; an elongated cylinder coaxial with and connected to said one end of said mold and extending in the opposite direction therefrom; a rod extending coaxially through said cylinder and said mold, said rod having a first piston secured thereto and located within said cylinder; means for supplying fluid pressure to opposite ends of said cylinder so that said piston and thereby said rod may be moved axially within said cylinder and mold; a second piston releasably secured to said rod and located within said mold and slidably contacting the internal wall thereof so as to form a movable end wall for said mold and fluid pressure within said cylinder will be effective to oppose movement of said second piston away from said one end of said mold.

3. The device defined in claim 2 including a sprue block supporting said one end of said elongated mold and having at least one passageway therethrough extending transverse to the axis of said mold and communicating with said opening through which plastic material is introduced into said elongated mold; and ram-and-cylinder means for driving moldable plastic material under a selected relatively high pressure through said passageway and into said elongated mold.

4. The device defined in claim 2 wherein said rod is of sufficient length that when said mold piston is at its terminal position remote from the end of the tubular mold in which plastic material is introduced, it extends at least partially out of said tubular mold; said second piston being removable from said rod when said rod is in such last named position whereby plastic material may be introduced into said tubular mold under substantial pressure to form a molded piece around said rod and within said tubular mold and may move said second piston against said constant pressure away from said one end of said tubular mold in order to form said pipe within said tubular mold and around said rod.

References Cited in the file of this patent

UNITED STATES PATENTS

| 1,206,150 | Slick | Nov. 28, 1916 |
| 1,934,855 | Humphrey | Nov. 14, 1933 |
| 2,163,177 | Novotny | June 20, 1939 |
| 2,434,594 | Schultz | Jan. 13, 1948 |

FOREIGN PATENTS

| 496,336 | Canada | Sept. 22, 1953 |
| 388,662 | Great Britain | Mar. 2, 1933 |